A. KÄSTNER.
WHEEL WITH A SPECIAL RIM FOR THE BRAKE.
APPLICATION FILED APR. 21, 1909.

982,368.

Patented Jan. 24, 1911.

Witnesses
Janet M. Wynkoop,
E. R. Heine.

Inventor,
Alfred Kästner,
By Knight Bros.
Attorneys.

UNITED STATES PATENT OFFICE.

ALFRED KÄSTNER, OF ESSEN-ON-THE-RUHR, GERMANY, ASSIGNOR TO FRIED. KRUPP AKTIENGESELLSCHAFT, OF ESSEN-ON-THE-RUHR, GERMANY.

WHEEL WITH A SPECIAL RIM FOR THE BRAKE.

982,368.     Specification of Letters Patent.     Patented Jan. 24, 1911.

Application filed April 21, 1909. Serial No. 491,352.

*To all whom it may concern:*

Be it known that I, ALFRED KÄSTNER, a subject of the Emperor of Germany, and a resident of 62 Goethestrasse, Essen-on-the-Ruhr, Germany, have invented certain new and useful Improvements in Wheels with a Special Rim for the Brake, of which the following is a specification.

The present invention relates to the type of wheels, especially wooden spoke-wheels, which has a special braking rim for the brake. These wheels are used in heavy vehicles, such as portable guns of great caliber, in which an endless track must, at times, be placed around the wheels so that the brake cannot engage the tire of the wheel. In the known wheels of this type the braking rim is secured to the spokes some distance from the felly. This arrangement of the braking rim requires complicated securing means for the braking rim and may cause breakage of the spokes when the brake is forcibly applied.

The object of the present invention is to provide a wheel of this type in which these drawbacks are avoided, and this object is attained by mounting the braking rim on the spoke-shoes which connect the spokes with the felly and in a position nearer the center of the wheel than the felly (preferably adjacent to the inner periphery of the felly) so as to leave the felly unobstructed for the reception and lateral engagement of the endless track; the braking rim being preferably provided with an internal braking surface.

One embodiment of the invention is shown in the accompanying drawings, by way of example, the invention being shown applied to a gun.

Figure 1:
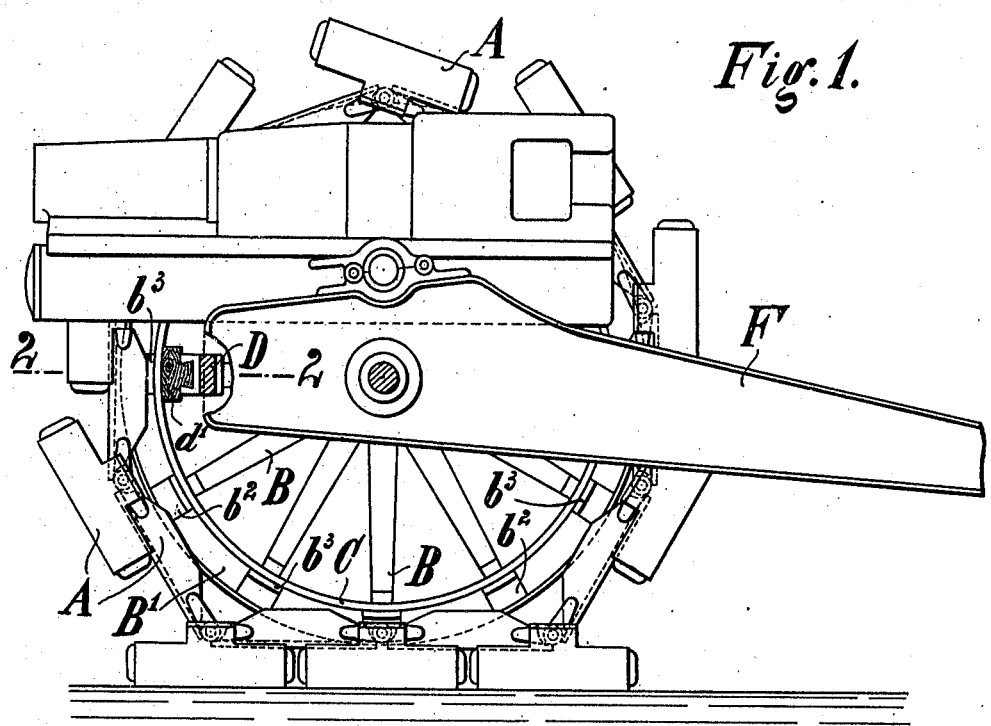
Figure 2:
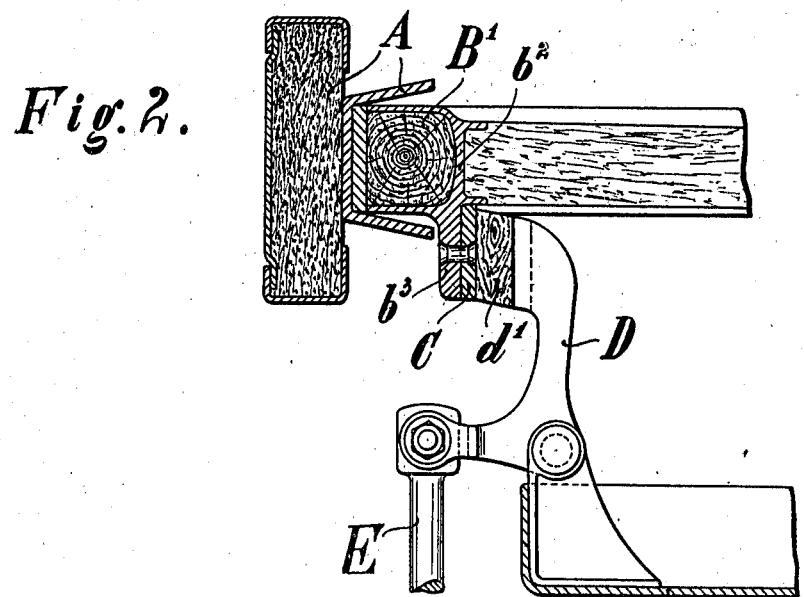

Figure 1 is a side view of the gun partly in section and Fig. 2 is a section on line 2—2, Fig. 1, looking from above.

An endless track composed of shoes A of known construction is placed around the wheel. The spokes B of the wheel are connected with the felly $B^1$ in the known manner by means of spoke-shoes $b^2$. The shoes $b^2$ are provided with lateral projections or laps $b^3$ to which the ring C is riveted. These laps are located radially inward from the outer periphery of the felly so as to leave the main body of the felly unobstructed for the reception of and lateral engagement with the trough-shaped fittings of the endless track and the braking rim or ring is preferably secured to the inner side of the projections which overlap it and has its braking surface on its inner face. The ring serves as braking rim for the brake of which the drawing shows the bell-crank lever D, which carries the brake-shoe $d^1$, and the rod E which leads to the operating member for the brake. The bell-crank lever D is swingingly mounted on the mount F.

The arrangement of the braking rim according to the present invention is simple and reliable and furthermore has the advantage that the braking force acts on a longer lever-arm than in the known wheels with braking rim.

Having thus described the invention, what is claimed and desired to be secured by Letters Patent is:—

1. A wheel having a felly with unobstructed sides, spokes, members connecting the spokes with the felly and a brake rim connected with the wheel through means of the spoke and felly connecting members, at points radially within an unobstructed side of the felly.

2. A wheel having a felly, spokes, connecting members between the spokes and the felly, and a rim secured to said connecting members and located inside of the outer circumference of the felly; said rim being adapted for engagement with the brake.

3. A wheel having a felly with unobstructed sides adapted to receive an endless track, spokes, members connecting the spokes with the felly, and a rim connected with the wheel through the members which connect the spokes and felly, at points radially within an unobstructed side of the felly; said rim being provided with an inwardly presented braking surface.

4. A wheel having a felly with unobstructed sides, spokes, shoes connecting the spokes to the felly, and a braking rim secured to the shoes, radially within an unobstructed side of the felly and adjacent to the spokes and adapted for engagement with a brake.

5. A wheel having a felly with unobstructed sides, spokes, shoes connecting the spokes to the felly and having lateral projections at points radially within an unobstructed side of the felly and a braking rim secured to and supported by said projections and adapted for the impingement of a brake shoe.

The foregoing specification signed at Barmen, Germany, this 16th day of March, 1909.

ALFRED KÄSTNER. [L. S.]

In presence of—
 OTTO KÖNIG,
 PAUL MÜLLER.